(12) United States Patent
Towns et al.

(10) Patent No.: US 7,173,103 B2
(45) Date of Patent: Feb. 6, 2007

(54) MODIFIED SUZUKI-METHOD FOR POLYMERIZATION OF AROMATIC MONOMERS

(75) Inventors: Carl Towns, Stansted (GB); Paul Wallace, Royston (GB); Ian Allen, Cambridge (GB); Thomas Pounds, Cambridge (GB); Lorraine Murtagh, Brentwood (GB)

(73) Assignee: Cambridge Display Technology Limited, Cambridge (GB)

( * ) Notice: Subject to any disclaimer, the term of this patent is extended or adjusted under 35 U.S.C. 154(b) by 0 days.

(21) Appl. No.: 10/493,643

(22) PCT Filed: Oct. 21, 2002

(86) PCT No.: PCT/GB02/04743

§ 371 (c)(1),
(2), (4) Date: Aug. 27, 2004

(87) PCT Pub. No.: WO03/035796

PCT Pub. Date: May 1, 2003

(65) Prior Publication Data

US 2005/0014926 A1    Jan. 20, 2005

(30) Foreign Application Priority Data

Oct. 25, 2001    (GB) .................... 0125622.1

(51) Int. Cl.
*C08G 79/08*    (2006.01)
(52) U.S. Cl. ............ 528/394; 528/397; 528/347; 528/400; 528/487

(58) Field of Classification Search ........... 528/394, 528/397, 398, 400, 487
See application file for complete search history.

(56) References Cited

U.S. PATENT DOCUMENTS 5,777,070 A    7/1998    Inbasekaran et al. ........ 528/394

FOREIGN PATENT DOCUMENTS

| WO | WO 96/16449 | 5/1996 |
|---|---|---|
| WO | WO 00/53656 | 9/2000 |

OTHER PUBLICATIONS

Application of "Transfer-Free" Suzuki Coupling Protocols Toward the Synthesis of "Unambiguously Linear" Poly($p$-phenylenes), Goodson et al., Macromolecules 31, 1998, pp. 2047-2056.
"Palladium-Catalyzed Synthesis of Pure, Regiodefined Polymeric Triarylamines", Goodson et al., Journal of the American Chemical Society, 121, 1999, pp. 7527-7539.
"Highly Active Palladium Catalysts for Suzuki Coupling Reactions", Wolfe et al., Journal of the American Chemical Society, 121, 1999, pp. 9550-9561.
International Search Report in PCT/GB02/04743 dated Feb. 27, 2003.

*Primary Examiner*—Duc Troung
(74) *Attorney, Agent, or Firm*—Marshall, Gerstein & Borun LLP

(57) ABSTRACT

A process for preparing high molecular weight polymers or copolymers by Suzuki coupling. The catalyst used in the process comprises a source of palladium and a source of a phosphine characterized in that at least one substituent on the phosphine is an ortho substituted aryl group. The process is suitable for the preparation of polymers for use in electronic and optoelectronic applications.

26 Claims, No Drawings

US 7,173,103 B2

MODIFIED SUZUKI-METHOD FOR POLYMERIZATION OF AROMATIC MONOMERS

This is the U.S. national phase of International Application No. PCT/GB02/04743 filed Oct. 21, 2002, the entire disclosure of which is incorporated herein by reference.

BACKGROUND OF THE INVENTION

1. Field of the Invention

The present invention relates to a process for preparing polymers and to high molecular weight polymers obtainable by such a process.

2. Description of Related Technology

The use of the Suzuki polymerization of aromatic monomers to form conjugated polymers is known from U.S. Pat. No. 5,777,070 and WO 00/53656. Such polymers have application in electroluminescent devices and photovoltaic devices.

Patent application WO 00/53656 discloses a process for preparing a conjugated polymer, which comprises polymerizing in a reaction mixture (a) an aromatic monomer having at least two reactive boron derivative groups selected from the group consisting of boronic acid groups, a boronic ester groups, and borane groups, and an aromatic monomer having at least two reactive halide functional groups; or (b) an aromatic monomer having one reactive halide functional group and one reactive boron derivative group selected from the group consisting of boronic acid groups, a boronic ester groups, and a borane groups, wherein the reaction mixture comprises a catalytic amount of a palladium catalyst, and a base in an amount sufficient to convert the reactive boron derivative groups into —B(OH)$_3$-anions. The palladium catalysts suggested for use in this process are Pd(0) complexes or Pd(II) salts, the use of a Pd(Ph$_3$P)$_4$ catalyst is exemplified. This catalyst is sensitive to air and moisture and must be prepared immediately prior to carrying out each reaction.

SUMMARY OF THE INVENTION

It has been found that in the above reaction the use of a catalyst comprising a source of palladium and a source of a phosphine having at least one substituent which is an ortho substituted aryl group, for example 'tri-o-tolylphospbine or tris(o-methoxyphenyl)phosphine, leads to shorter reaction times, yields polymers of higher molecular weight and gives improved reproducibility, thereby making polymers more readily available and providing polymers of higher molecular weight. In addition the catalysts of the invention are not sensitive to air and moisture so do not suffer from the disadvantage of prior art catalysts and can be prepared and stored prior to their use.

DETAILED DESCRIPTION OF THE INVENTION

In a first embodiment the invention provides a process for preparing a high molecular weight polymer or copolymer, which comprises polymerizing in a reaction mixture (a) at least an aromatic monomer having at least two boron derivative functional groups selected from a the group consisting of boronic acid groups, boronic ester groups, and a borane groups, and at least an aromatic monomer having at least two reactive halide functional groups; or (b) at least an aromatic monomer having one reactive halide functional group and one boron derivative functional group selected from a the group consisting of boronic acid groups, a boronic ester groups and a borane groups, wherein the reaction mixture comprises a catalytic amount of a catalyst suitable for catalyzing the polymerization of the aromatic monomers, and a base in an amount sufficient to convert the boron derivative functional groups into-BX$_3$-anionic groups, wherein X is independently selected from the group consisting of F and OH, the catalyst comprises a source of palladium and a source of a phosphine characterised in that at least one substituent on said phosphine is an ortho substituted aryl group.

Preferred phosphine derivatives are those with at least one o-tolyl substituent, a particularly preferred phosphine is tri-o-tolylphosphine.

An alternative group of preferred phosphines comprise at least one ortho substituted aryl group comprising a chelating group. The presence of the chelating group is considered to enhance the stability of the palladium complex. Tris(o-methoxyphenyl)phosphine is such a preferred phosphine derivative having an ortho methoxy substituent comprising a chelating oxygen atom.

In a further embodiment the palladium is in the form of palladium (II), this may be provided in the form of a palladium (II) complex having the structure PdXX'RR', wherein X and X' may be the same or different and are selected from the group consisting of chloride, bromide, iodide, mesyl, triflyl, cyano, and acetyl, wherein R and R' are substituted or unsubstituted triaryiphosphines or substituted or unsubstituted tricycloalkylphosphines, provided that at least one of R and R' comprises a triaryiphosphine with a substituent in the ortho position of at least one of the aryl groups, preferably at least one of the aryl groups is an o-tolyl group. In a particularly preferred embodiment palladium is provided in the form of a palladium (II) complex having the structure PdCl$_2$(tri-o-tolylphosphine)$_2$.

In a further embodiment the palladium is in the form of a soluble palladium (0) complex and a separate source of a phosphine having an ortho substituted aryl group is added, preferably the phosphine comprises at least one o-tolyl substituent, in a preferred embodiment said phosphine comprises tri-o-tolylphosphine. In an alternative embodiment said phosphine comprises tris(o-methoxyphenyl)phosphine. The palladium (0) may be added, for example, in the form of any of the following;

tris(dibenzylideneacetone)dipalladium (0) (Pd$_2$(dba)$_3$),
bis(tri-t-butylphosphine) palladium (0),
bis[1,2-bis(diphenylphosphino)ethane] palladium (0),
bis(tricyclohexylphosphine) palladium (0),
tetrakis(triphenylphosphine)palladium (0)

In a more preferred embodiment palladium is added in the form of tris(dibenzylideneacetone)dipalladium (0) and the phosphine is tri-o-tolylphosphine.

In a further embodiment the palladium (II) is in the form of a palladium (II) complex and a separate source of a phosphine having an ortho substituted aryl group is added. Preferably the phosphine comprises at least one o-tolyl substituent, in a more preferred embodiment the, phosphine comprises tri-o-tolylphosphine. In an alternative embodiment said phosphine comprises tris(o-methoxyphenyl)phosphine. In such embodiments preferred palladium(II) sources include;

diacetatobis(triphenylphosphine)palladium (II),
dichlorobis(benzonitrile)palladium (II) (Pd(BnCN)$_2$Cl$_2$),
dichlorobis(acetonitrile)palladium (II) (Pd(MeCN)$_2$Cl$_2$),
dichloro(1,2-bis(diphenylphosphino)ethane)palladium (II), dichloro[1,1'bis(diphenylphosphino)ferrocene]palladium (II),
trans-dichlorobis(tricyclohexylphosphine)palladium (II),
trans-dichlorobis(triphenylphosphine)palladium (II),
dichloro(1,5-cyclooctadiene)palladium (II),
trans-dichlorodiammine palladium (II),
palladium (II) acetate,
palladium (II) acetylacetonate,
palladium (II) bromide,
palladium (II) chloride,
palladium (II) cyanide,
palladium (II) iodide,
tetrakis(acetonitrile)palladium (II) tetrafluoroborate In particular dichlorobis(benzonitrile)palladium (II) and dichlorobis(acetonitrile)palladium (II) are preferred sources of palladium.

In a further embodiment the base may be selected from the group consisting of alkaline earth carbonates, alkaline earth bicarbonates, and organic bases. The use of organic bases is preferred.

In a preferred embodiment the aromatic monomer or in the case of copolymers said aromatic monomers are selected from the group consisting of fused carbocyclic rings or from the group consisting of heterocyclic rings or from the group consisting of arylamines. In a more preferred embodiment the aromatic monomer or in the case of copolymers the aromatic monomers are selected from the group consisting of fluorenes, benzothiadiazoles, triarylamines, thiophenes, and quinoxalines.

Experiments with phenylene monomers such as alkyl substituted phenylenes or alkoxy substituted phenylenes although successfully providing polymers have been found to give polymers of lower molecular weight. It is preferred the aromatic, monomers are not phenylenes such as alkyl substituted phenylenes or alkoxy substituted phenylenes.

The invention also provides for the use, in a process for preparing a high molecular weight polymer, of a catalyst comprising a source of palladium and a source of a phosphine characterised in that at least one substituent on said phosphine is an ortho substituted aryl group.

The process can be used to prepare high molecular weight polymers or copolymers. The polymers and copolymers prepared according to the present invention may be used in optoelectronic devices such as electroluminescent devices.

The polymers prepared according to the invention may be conjugated polymers. The term conjugated refers to either a fully conjugated polymer i.e. a polymer which is conjugated along the full length of its chain, or a partially conjugated polymer i.e. a polymer which contains conjugated segments together with non-conjugated segments.

The term "aromatic monomer" refers to any monomer which has the respective functional groups directly substituted on one or more aromatic rings. In the case of monomers having more than one aromatic ring, the functional groups can be substituted on either the same or different aromatic rings.

Examples of suitable types of monomers include fluorenes, quinoxalines, benzothiazoles, triarylamines, phenylenes, thiophenes, naphthylenes and stilbenes. Each aromatic group within the monomer may be substituted or unsubstituted. Preferred types of monomers are those aromatic monomers comprising fused carbocyclic rings, comprising heterocyclic rings, or comprising triarylamines including fluorenes, benzothiadiazoles, triarylamines, thiophenes and qumoxalines. It has been determined that although polymers may be prepared from phenylene monomers by the process of the invention such polymers are of lower molecular weight and are therefore not a preferred.

Particularly preferred monomers for use in the process include fluorenes and arylamines such as 9,9-dioctylfluorene (F8), benzothiadiazole (BT), (1,4-phenylene-((4-secbutylphenyl)imino)-1,4-phenylene) (TFB), (2,7-(9,9-di-n-octylfluorene)-3,6-benzothiadiazole) (F8BT). One or more of the monomers could also be a pre-formed oligomeric or polymeric chain comprising several smaller units with the necessary functional groups provided at the desired positions on the chain. Other preferred monomers are show below, wherein $X_1$ and $X_2$ are reactive boron derivative groups or reactive halides.

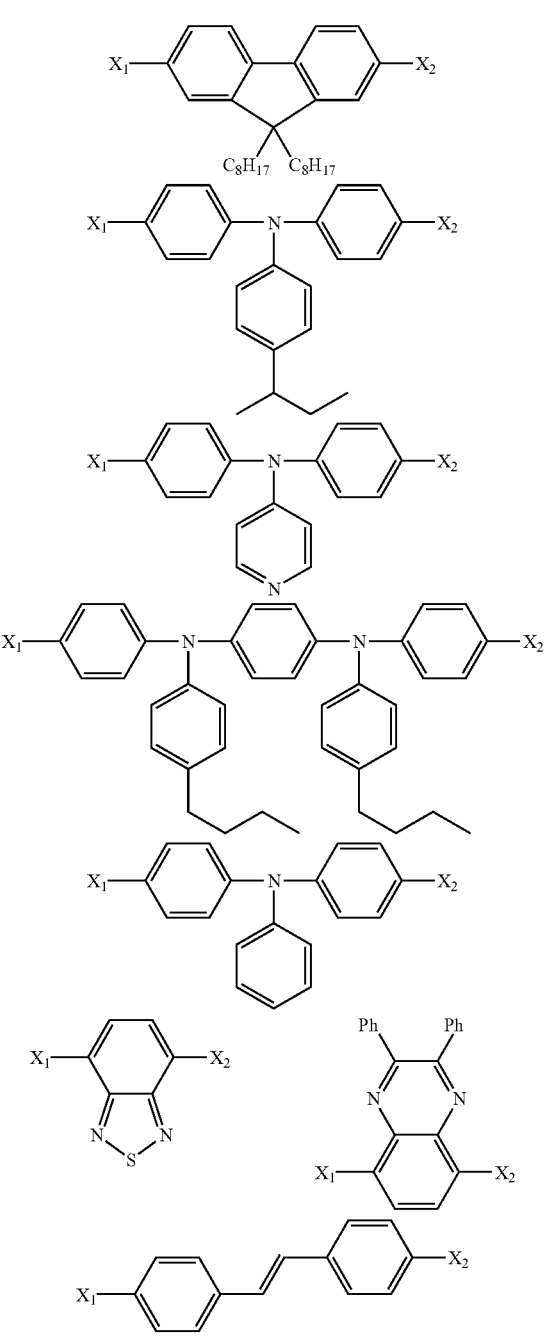

It is also envisaged that under the appropriate reaction conditions, this invention could be extended to the use of monomers in which some or all of the functional groups are not directly substituted on an aromatic ring, in particular to other kinds of unsaturated monomers.

Monomers particularly useful in the invention include those which may be polymerized to form a semiconductive polymer such as a semiconductive conjugated polymer for use in an optical device such as an electroluminescent device. Suitable monomers include fluorenes, benzothiazoles, triarylamines, thiophenes and quinoxalines. Such polymers may be used in an emissive layer or as a hole transport or electron transport polymer. Luminescent polymers are particularly useful in such devices. The conjugated polymer may be fully or partially conjugated, perhaps containing conjugated segments and may be a homopolymer, a copolymer or an oligomer, and may be a linear or a branched chain polymer such as a dendrimer.

As described above, the monomers must each have the appropriate functional groups for the Suzuki reaction. In one arrangement, a first reactive dihalide monomer is polymerized with a second monomer having two boron derivative functional groups. In this arrangement the first and the second monomers may be the same or different. Where the monomers are the same, a homopolymer is produced. Where the monomers are different, a copolymer is produced.

Preferably, the reactive halide functional group on the reactive dihalide monomer or the monomer having the reactive halide functional group is Br or I although it Is possible to use instead groups such as chlorine, triflate (CF3SO3-), tosylate and mesylate.

With respect to the boron-derivative functional groups, the boronic acid group is represented by —$B(OH)_2$; the boronic ester group is preferably —$B(OR^1)$ $(OR^1)$ or —$B(OR^5O)$ and the borane group is preferably —$BR^3R^4$, wherein $R^1$ is a substituted or non-substituted $C_1$–$C_6$ alkyl group and $R^2$ is H or a substituted or non-substituted $C_1$–$C_6$ alkyl group; $R^3$ and $R^4$ are each independently substituted or nonsubstituted $C_1$–$C_6$ alkyl groups, and $R^5$ is a substituted or non-substituted divalent hydrocarbon radical resulting in a 5 or 6 membered ester ring. Examples of suitable groups as $R^5$ include substituted or non-substituted $C_2$ or $C_3$ alkylene groups, or substituted or non-substituted ortho-or metaphenylene groups. Suitable boronic ester groups include, for example, the products of esterification of the corresponding boronic acid group with monovalent $C_1$–$C_6$ alcohols, ethane diols such as pinacol, propane diols or ortho aromatic diols such as 1,2-dihydroxybenzene.

The base used in the reaction may be an inorganic base such as an alkaline earth carbonate or bicarbonate or an organic base, such as those organic bases disclosed in WO 00/53656, including alkyl ammonium hydroxides, alkyl ammonium carbonates, alkyl ammonium biscarbonates, alkylammonium borates, 1,5-diazabicyclo [4.3.0] non-5-ene (DBN), 1,8-diazabicyclo [5.4.0] undec7-ene (DBU), 1,4-diazabicyclo [2.2.2] oxtane (DABCO), dimethylaminopyridine (DMAP), pyridine, trialkylamines and alkylammonium fluorides such as tetraalkylammonium fruorides. The base is preferably a tretraalkyl ammonium hydroxide such as tetramethyl ammomium hydoxide, tetraethyl ammonium hydroxide or tetra-n-propyl ammonium hydroxide. The base is added in aquantity sufficient to convert the boron derivative functional groups into —$B(OH)_3$ or —$BF_3$ anionic groups depending onthe particular basse selected.

The source of palladium and a suitable source of phosphine may be added as a single component or as separate components. In the former case the source of palladium and the suitable source of phosphine could be added in the form of a palladium (II) complex such as $PdCl_2$(tri-o-tolylphosphine)$_2$. Where the components of the catalyst are added separately a suitable phosphine is added and the palladium (0) could be added in the form of a soluble palladium (0) complex such as $Pd_2(dba)_3$. Where the components are added separately the source of palladium could also be added as Pd(II) complex such as $Pd(BnCN_2Cl_2$ and $Pd(MeCN)_2Cl_2$. Where the phosphine compound is added separately it is preferably added in an amount of 2.2 molar equivalents based on the amount of palladium added. While not wishing to be bound by theory it is believed that the palladium complexes comprising two chloro substituents and two labile substituents such as dichlorobis(benzonitrile) palladium (II) and dichlorobis(acetonitrile) palladium (II) form the particularly efficacious catalyst $PdCl_2$(tri-o-tolylphosphine)$_2$ in situ in the reaction mixture in the presence of tri-o-tolylphosphine.

It is preferable that the reaction mixture includes a solvent in which the polymer is soluble. For example, in the case of polyfluorenes, non-polar aromatic solvents such as anisole, benzene, ethylbenzene, mesitylene, xylene, and particularly toluene are preferred. It is also preferable that the reaction mixture includes a solvent in which the organic cation boronate salt produced by the reaction of the organic base with the boron derivative functional groups is soluble.

Where the boron-derivative functional group is a boronic ester or borane group, the reaction mixture should include sufficient water to hydrolyze the boronic ester or borane group to the corresponding boronic acid group. The base is preferably added to the reaction mixture in the form of an aqueous solution to thereby provide sufficient water to hydrolyze the boronic ester or borane groups to the corresponding boronic acid groups.

It is preferable to carry out the polymerization in a single liquid phase by using an organic solvent or solvent mixture in which all the reaction components, i.e. the boronate salt produced by the reaction of the base with the boron-derivative functional groups and the dihalide monomers where applicable, are soluble, and with which water present for hydrolysis of boronic ester groups or borane groups is miscible. The reaction mixture may further comprise an aqueous solution of an inorganic base, this is preferred from the point of view of producing polymers of particularly high molecular weight.

In the process of the invention, the molecular weights grow gradually with time in these very controlled polymerizations. This has the advantage that repeatable and desired molecular weights can be achieved by stopping the reaction at the appropriate stage. The reaction may be stopped by the addition of end capping reagents such as bromobenzene and phenylboronic acid. In any case it is preferred to add end capping reagents after termination of the reaction.

High molecular weight polymers prepared according to the invention may be used in optoelectronic devices such as electroluminescent devices and photovoltaic devices. An electroluminescent device typically comprises, on a suitable substrate, an anode, a cathode and a layer of light-emitting material positioned between the anode and the cathode. Electroluminescent devices may further comprise charge transport layers and/or charge injecting layers positioned between the light-emitting material and the anode or cathode as appropriate. In electroluminescent devices of the present invention the high molecular weight polymers of the invention may be present either as the light-emitting layer or as charge transporting or charge injecting layers or alternatively as charge transporting components in a blend with a light emitting material or as light emitting components in a blend with a charge transporting material. The thickness of the emitting layer can be in the range 10 nm–300 nm, preferably 50 nm–200 nm.

The anode of the device preferably comprises a material of high work function deposited on a substrate. Preferably the material has a work function greater than 4.3 eV, examples of such materials include indium-tin oxide (ITO), tin oxide (TO), aluminum or indium doped zinc oxide, magnesium-indium oxide, cadmium tin-oxide and metals such as Au, Ag, Ni, Pd and Pt. Suitable substrates include glass and plastics, the substrate may be rigid or flexible, transparent or opaque. The material of high work function is suitably deposited on the substrate to form a film of 50 nm to 200 nm, preferably said film has a sheet resistance of 10–100 Ohm/square, more preferably less than 30 Ohm/square.

The cathode of the device is preferably a material of low work function, preferably of work function less than 3.5 eV. Examples of such materials include Li, Na, K, Rb, Be, Mg, Ca, Sr, Ba, Yb, Sm, and Al, the cathode may comprise an alloy of such metals or an alloy of such metals in combination with other metals, for example the alloys MgAg and LiAl. The cathode preferably comprises multiple layers, for example Ca/Al or LiAl/Al. The device may further comprise a layer of dielectric material between the cathode and the emitting layer, such as is disclosed in WO 97/142666. In particular it is preferred to use an alkali or alkaline earth metal fluoride as a dielectric layer between the cathode and the emitting material. A particularly preferred cathode comprises LiF/Ca/Al, with a layer of LiF of thickness from 1 to 10 nm, a layer of Ca of thickness 1 to 25nm and a layer of Al of thickness 10 to 500 nm.

Where the electroluminescent device comprises further charge injecting or charge transporting materials, these further materials may be present as separate layers or in blend with the light emitting material. Examples of suitable charge transporting materials include polystyrene sulfonic acid doped polyethylene dioxythiophene (PEDOT-PSS), polyaniline with anionic dopants such as polymeric anionic dopants, and triarylamines, including polymeric triarylamines such as poly(2,7-(9,9-ni-n-octylfluorene)-(1,4-phenylene-(4-imino(benzoic acid))-1,4-phenylene-(4-imino(benzoic acid))-1,4-phenylene)) BFA. The charge transport or charge injecting layers suitably have a thickness in the range 10 nm to 200 nm, preferably 1 nm to 50 nm.

A preferred structure of an electroluminescent devices comprises a glass substrate, an ITO anode, a charge transporting layer of PEDOT-PSS, a layer of light-emitting material, a thin layer of LiF and a cathode comprising a layer of calcium and a layer of aluminum.

The high molecular weight polymers prepared according to the invention could also be suitably used in photovoltaic devices such as those disclosed in WO 96/16449.

The following examples are included for illustrative purposes only. In the following examples the term F8 diester refers to the compound 9,9-di-n-octylfluorene-2,7-di(ethyleneborate), the term TFB dibromide refers to the compound N,N-bis(4-bromophenyl)-4-sec-butylphenylamine the term BT dibromide refers to the compound 2,7-dibromobenzothiadiazole.

EXAMPLES

Example 1

Preparation of TFB Polymer with Dichlorobis(tri-o-tolylphosphine) Palladium(II)

To a 1l reaction vessel were added 285 ml toluene, 15.17 g F8 diester and 13.12 g TFB dibromide, the solution was degassed by sparging with $N_2$ at 25–35° C. for 1 hour. 66.8 mg of dichlorobis(tri-o-tolylphosphine)palladium(ll) catalyst were then added and the solution stirred for 15 minutes. 96 ml of a tetraethylammoniumhydroxide (20% Aq) base were then added followed by stirring for 10 minutes. The reaction mixture was then refluxed for 18–20 hours at 115° C. End capping reagents were then added as follows, 3 ml bromobenzene was added and allowed to react for 1 hour at a temperature of 115° C., then 3 g phenylboronic acid was added and allowed to react for 1 hour at a temperature of 115° C. The reaction mixture was allowed to cool to room temperature and poured into 4l methanol. The polymer was obtained as a precipitate. The F8TFB polymer obtained had a molecular weight in the range of 220 000.

Example 2

Preparation of TFB Polymer with Dichlorobis(benzonitrile) Palladium(II) Plus Tri-o-tolylphosphine To a 1l reaction vessel were added 285 ml toluene, 15.17 g F8 diester and 13.12 g TFB dibromide, the solution was degassed by sparging with $N_2$ at 25–35° C. for 1 hour. The catalyst was then added as 66.8 mg dichlorobis(benzonitrile) palladium(II) and 57 mg of tri-o-tolylphosphine and the solution stirred for 15 minutes. 96 ml of a tetraethylammoniumhydroxide (20% Aq) base were then added followed by stirring for 10 minutes. The reaction mixture was then refluxed for 18–20 hours at 115° C. End capping reagents were then added as follows, 3 ml bromobenzene was added and allowed to react for 1 hour at a temperature of 115° C., then 3 g phenylboronic acid was added and allowed to react for 1 hour at a temperature of 115° C. The reaction mixture was allowed to cool to room temperature and poured into 4l methanol. The polymer was obtained as a precipitate. The F8TFB polymer obtained had a molecular weight of 169 000.

Example 3

Preparation of TFB Polymer with Tris(dibenzvlideneacetone)dioalladium(0) Plus Tri-otolylphosphine To a 1l reaction vessel were added 285ml toluene, 15.17g F8 diester and 13.12 g TFB dibromide, the solution was degassed by sparging with $N_2$ at 25–35° C. for 1 hour. The catalyst was then added as 78.6 mg tris(dibenzylideneacetone)dipalladium(0) and 154 mg of tri-o-tolylphosphine and the solution stirred for 15 minutes. 96 ml of a tetraethylammoniumhydroxide (20% Aq) base was then added followed by stirring for 10 minutes. The reaction mixture was then refluxed for 18–20 hour at 115° C. End capping reagents were then added as follows, 3 ml bromobenzene was added and allowed to react for 1 hour at a temperature of 115° C., then 3 g phenylboronic acid was added and allowed to react for 1 hour at a temperature of 115° C. The reaction mixture was allowed to cool to room temperature and poured into 4l methanol. The polymer was obtained as a precipitate. The F8TFB polymer obtained had a molecular weight of 241 000.

In order to investigate the role of the ortho aryl substituted phosphine in the above reactions Examples 2 and 3 were repeated with no tri-o-tolylphosphine added. In Comparative Example 4 PdCl$_2$(BnCN)$_2$ was used as catalyst and no polymer formation was observed in the absence of tri-o-tolylphosphine. In Comparative Example 5 Pd$_2$(dba)$_3$ was used as catalyst and no polymer formation was observed in the absence of tri-o-tolylphosphine.

In order to investigate the general applicability of the process of the invention to a wide range of monomer systems analogous experiments to those detailed above were carried out in which the TFB dibromide monomer was replaced with a BT dibromide. An experiment was also carried out using the compound triphenylphosphine as additive rather than tri-o-tolylphosphine, this yielded a polymer of low molecular weight. The results of these experiments are shown in Table 1. In Table 1 the abbreviation o-tol is used to represent the o-tolyl substituent.

Additional experiments have been carried out using phenylene monomers, the results of these experiments indicate that although the process does result in the formation of phenylene based polymers these are generally of lower molecular weight, for example a reaction carried out as above between 1,4-dibromo-2,5-dipentyloxybenzene and 1,4-dioctyl-2,5-(di( 1,1,2,2-tetramethylethylene)borate)benzene in the presence of dichlorobis(tri-o-tolylphosphine)palladium(II) and tetraethylammonium hydroxide in toluene solvent gave polymers with molecular weights of around 3000.

TABLE 1

Preparation of polymers

| | Monomer 1 | Monomer 2 | Pd compound | (o-tol) Reagent added | Molecular Weight of polymer |
|---|---|---|---|---|---|
| Example 1 | F8 diester | TFB dibromide | PdCl$_2$((P(o-tol)$_3$)$_2$ | (as Pd complex) | 220 000 |
| Example 2 | F8 diester | TFB dibromide | Pd(BnCN)$_2$Cl$_2$ | P(o-tol)$_3$ | 169 000 |
| Example 3 | F8 diester | TFB dibromide | Pd$_2$(dba)$_3$ | P(o-tol)$_3$ | 241 000 |
| Comparative Example 4 | F8 diester | TFB dibromide | PdCl$_2$(BnCN)$_2$ | None | No polymer |
| Comparative Example 5 | F8 diester | TFB dibromide | Pd$_2$(dba)$_3$ | None | No polymer |
| Example 6 | F8 diester | BT dibromide | Pd(BnCN)$_2$Cl$_2$ | P(o-tol)$_3$ | 149 000 |
| Comparative Example 7 | F8 diester | BT dibromide | Pd(BnCN)$_2$Cl$_2$ | PPh$_3$ | 54 000 |
| Example 8 | F8 diester | BT dibromide | PdCl$_2$(P(o-tol)$_3$)$_2$ | (as Pd complex) | 236 000 |
| Example 9 | F8 diester | BT dibromide | Pd(MeCN)$_2$Cl$_2$ | P(o-tol)$_3$ | 148 000 |
| Example 10 | F8 diester | BT dibromide | Pd$_2$(dba)$_3$ | P(o-tol)$_3$ | 523 000 |

The efficacy of the process of the invention in the production of a range of polymers and copolymers and in particular high molecular weight polymers and copolymers is readily apparent from the above table.

The invention claimed is:

1. A process for preparing polymers, which comprises polymerizing in a reaction mixture (a) at least an aromatic monomer having at least two boron derivative functional groups selected from the group consisting of boronic acid groups, boronic ester groups, and borane groups, and at least an aromatic monomer having at least two reactive halide functional groups; or (b) at least an aromatic monomer having one reactive halide functional group and one boron derivative functional group selected from the group consisting of boronic acid groups, boronic ester groups, and borane groups, wherein the reaction mixture comprises a catalytic amount of a catalyst suitable for catalyzing the polymerization of the aromatic monomers, and a base in an amount sufficient to convert the boron derivative functional groups into —BX$_3$-anionic groups, wherein X is independently selected from the group consisting of F and OH, and said catalyst comprises a source of palladium in the form of palladium (II) and a source of a phosphine characterized in that at least one substituent on said phosphine is an ortho substituted aryl group.

2. Process according to claim 1 wherein said phosphine comprises at least one o-tolyl substituent.

3. Process according to claim 2 wherein said phosphine comprises tri-o-tolylphosphine.

4. Process according to claim 1 comprising providing the palladium (II) in the form of a palladium (II) complex having the structure PdXX'RR', wherein X and X' may be the same or different and are selected from the group consisting of chloride, bromide, iodide, mesityl, triflyl, cyano, and acetyl, and wherein R and R' are substituted or unsubstituted triarylphosphines or substituted or unsubstituted tricycloalkylphosphines, provided that at least one of R and R' comprises a triarylphosphine with a substituent in the ortho position of at least one of the aryl groups.

5. Process according to claim 4 wherein at least one of said groups R and R' comprises a triarylphosphine in which at least one of the aryl groups is an o-tolyl group.

6. Process according to claim 5 comprising providing the palladium (II) in the form of a palladium (II) complex having the structure PdCl$_2$(tri-o-tolylphosphine)$_2$.

7. Process according to claim 1 wherein the palladium (II) is in the form of a palladium (II) complex and comprising adding a separate source of a phosphine having an ortho substituted aryl group.

8. Process according to claim 7 wherein said phosphine comprises at least one o-tolyl substituent.

9. Process according to claim 8 wherein said phosphine comprises tri-o-tolylphosphine.

10. Process according to claim 7 wherein said palladium (II) complex is selected from the group consisting of diacetatobis(triphenylphosphine) palladium (II), dichlorobis(benzonitrile)palladium (II), dichlorobis(acetonitrile) palladium (II), dichloro(1,2- bis(diphenylphosphino)ethane) palladium (II), dichloro[1,1'bis(diphenylphosphino) ferrocene palladium (II), trans-dichloro bis(tricyclohexylphosphine)palladium (II), trans-dichlorobis(triphenylphosphine) palladium (II), dichloro(1,5-cyclooctadiene)palladium (II), trans-dichlorodiammine palladium (II), palladium (II) acetate, palladium (II) acetylacetonate, palladium (II) bromide, palladium (II) chloride, palladium (II) cyanide, palladium (II) iodide, and tetrakis (acetonitrile)palladium (II) tetrafluoroborate.

11. Process according to claim 10 wherein said palladium (II) complex is selected from the group consisting of dichlorobis(benzonitrile)palladium (II) and dichlorobis(acetonitrile)palladium (II).

12. A process for preparing polymers, which comprises polymerizing in a reaction mixture (a) at least an aromatic monomer having at least two boron derivative functional groups selected from the group consisting of boronic acid groups, boronic ester groups, and borane groups, and at least an aromatic monomer having at least two reactive halide functional groups; or (b) at least an aromatic monomer having one reactive halide functional group and one boron derivative functional group selected from the group consisting of boronic acid groups, boronic ester groups, and borane groups, wherein the reaction mixture comprises a catalytic amount of a catalyst suitable for catalyzing the polymerization of the aromatic monomers, and a base in an amount sufficient to convert the boron derivative functional groups into —$BX_3$-anionic groups, wherein X is independently selected from the group consisting of F and OH, and said catalyst comprises a source of palladium and a source of a phosphine wherein at least one substituent on said phosphine is an ortho substituted aryl group comprising a chelating group.

13. Process according to claim 12 wherein said phosphine comprises tris(o-methoxyphenyl)phosphine.

14. Process according to claim 12 wherein the palladium is in the form of a soluble palladium (0) complex and comprising adding a separate source of a phosphine having an ortho substituted aryl group.

15. Process according to claim 14 comprising providing the palladium (0) in the form of tri(dibenzylideneacetone) dipalladium (0), bis(tri-t-butylphosphine)palladium (0), bis [(1,2-bis(diphenylphosphino)ethane] palladium (0), or bis (tricyclohexylphosphine)palladium (0).

16. Process according to claim 15 comprising providing the palladium (0) in the form of tris(dibenzylideneacetone) dipalladium (0).

17. Process according to claim 14 wherein said phosphine comprises tris(o-methoxyphenyl)phosphine.

18. Process according to claim 1 wherein said base is selected from the group consisting of alkaline carbonates, alkaline bicarbonates and organic bases.

19. A process for preparing polymers for use in optoelectronic devices, which comprises polymerizing in a reaction mixture (a) at least an aromatic monomer having at least two boron derivative functional groups selected from the group consisting of boronic acid groups, boronic ester groups, and borane groups, and at least an aromatic monomer having at least two reactive halide functional groups; or (b) at least an aromatic monomer having one reactive halide functional group and one boron derivative functional group selected from the group consisting of boronic acid groups, boronic ester groups, and borane groups, wherein each aromatic monomer comprises an arylamine, the reaction mixture comprises a catalytic amount of a catalyst suitable for catalyzing the polymerization of the aromatic monomers, and a base in an amount sufficient to convert the boron derivative functional groups into —$BX_3$-anionic groups, wherein X is independently selected from the group consisting of F and OH, and said catalyst comprises a source of palladium and a source of a phosphine wherein at least one substituent on said phosphine is an ortho substituted aryl group.

20. Process according to claim 19 wherein said aromatic monomer comprises a triarylamine.

21. A process for preparing a high molecular weight polymers for use in optoelectronic devices, comprising the step of polymerizing arylamine monomers using a catalyst comprising a source of palladium and a source of a phosphine wherein at least one substituent on said phosphine is an ortho substituted aryl group.

22. Process according to claim 7 wherein said phosphine comprises tris(o-methoxyphenyl)phosphine.

23. Process according to claim 1 wherein said base is an organic base.

24. An optoelectronic device comprising a polymer prepared by the process of claim 19.

25. An optoelectronic device comprising a polymer prepared by the process of claim 21.

26. A process for preparing polymers, which comprises polymerizing in a reaction mixture (a) at least an aromatic monomer having at least two boron derivative functional groups selected from the group consisting of boronic acid groups, boronic ester groups, and borane groups, and at least an aromatic monomer having at least two reactive halide functional groups; or (b) at least an aromatic monomer having one reactive halide functional group and one boron derivative functional group selected from the group consisting of boronic acid groups, boronic ester groups, and borane groups, wherein the reaction mixture comprises a catalytic amount of a catalyst suitable for catalyzing the polymerization of the aromatic monomers, and a base in an amount sufficient to convert the boron derivative functional groups into —$BX_3$-anionic groups, wherein X is independently selected from the group consisting of F and OH, and said catalyst comprises a source of palladium and a source of a phosphine wherein at least one substituent on said phosphine is an ortho substituted aryl group comprising a methoxy group at the ortho position.

\* \* \* \* \*

UNITED STATES PATENT AND TRADEMARK OFFICE
CERTIFICATE OF CORRECTION

PATENT NO. : 7,173,103 B2 Page 1 of 1
APPLICATION NO. : 10/493643
DATED : February 6, 2007
INVENTOR(S) : Towns et al.

It is certified that error appears in the above-identified patent and that said Letters Patent is hereby corrected as shown below:

In the Claims:

At Column 10, line 67, claim 10, "(tnphenylphosphine)" should be
-- (triphenylphosphine) --

At Column 12, line 19, claim 21, "preparing a high molecular weight" should be
-- preparing high molecular weight --

Signed and Sealed this

Twenty-ninth Day of April, 2008

JON W. DUDAS
*Director of the United States Patent and Trademark Office*